Aug. 28, 1951     S. D. BRADLEY ET AL     2,566,282
VEHICLE FENDER STRUCTURE
Filed Oct. 22, 1949
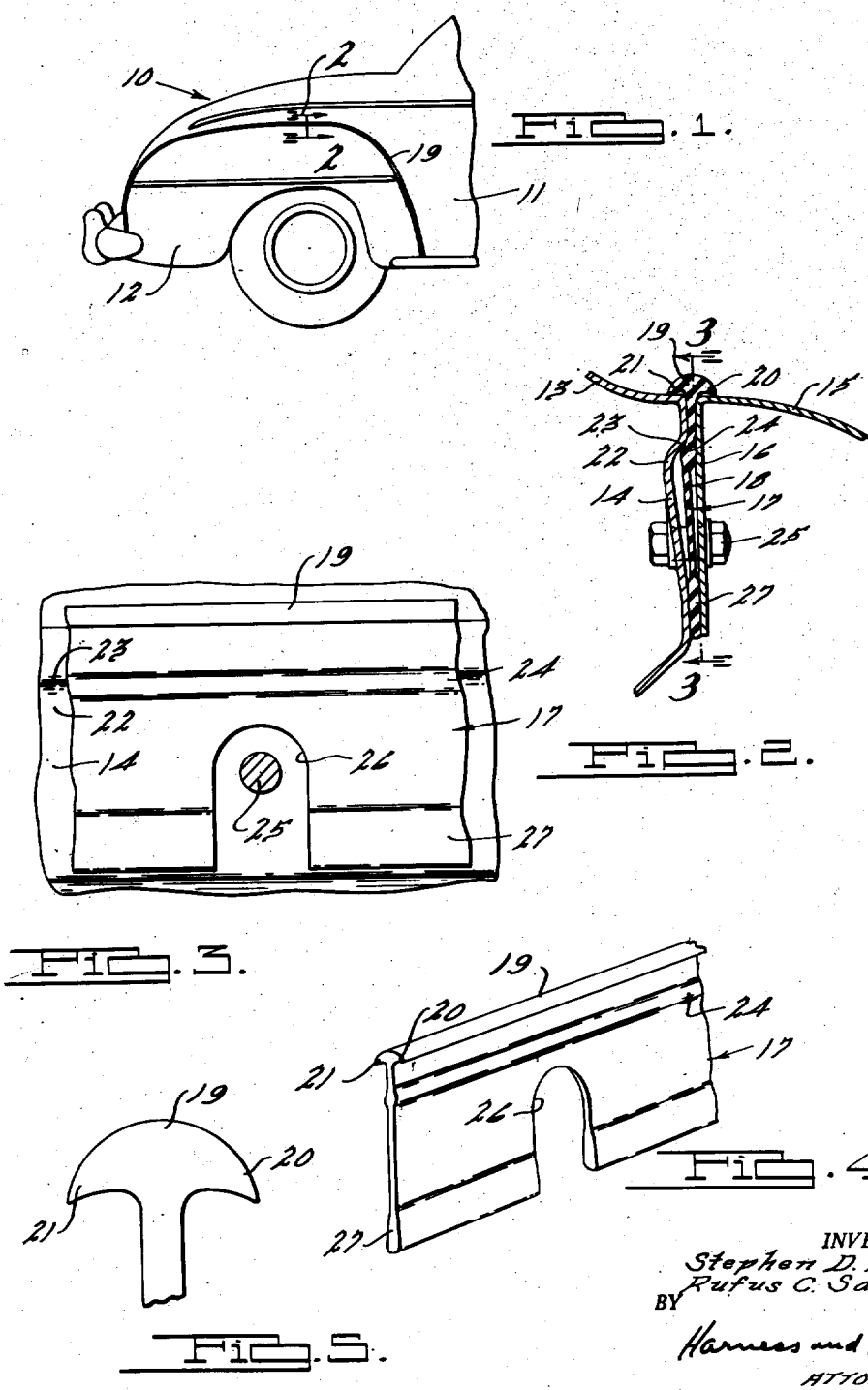
INVENTORS.
Stephen D. Bradley,
Rufus C. Sanders.
BY Harness and Harris
ATTORNEYS.

Patented Aug. 28, 1951

2,566,282

UNITED STATES PATENT OFFICE 2,566,282

VEHICLE FENDER STRUCTURE

Stephen D. Bradley, Grosse Pointe, Mich., and Rufus C. Sanders, Evansville, Ind., assignors to Chrysler Corporation, Highland Park, Mich., a corporation of Delaware Application October 22, 1949, Serial No. 122,912

3 Claims. (Cl. 280—153.5)

1

Our invention relates to motor vehicles generally and more particularly to an improved welt for the assembly of the rear fenders on the vehicle bodies.

In the past, portions of the fender welts used have been fabric of various types which are readily susceptible to the absorption of water. As a result, the water retained by the welts has caused both the fender and the body of the vehicle to rust at the juncture of the two.

A principal object of our invention is to provide a vehicle body and fender assembly with an improved fender welt which will not absorb moisture and cause rusting at the juncture of the fender and body.

Another object of our invention is to provide a fender welt of the type which is more pliable and therefore easier to handle than the conventional welts known to the art.

A further object of our invention is to provide a fender and body assembly with an improved fender welt which not only seals the juncture of the fender and the body but also covers slight mismatches of the two.

Still another object of our invention is to provide an improved welt which is easily clamped between the fender and the body, has a very neat appearance and is easily and economically manufactured.

Other objects and advantages will become more apparent from the following description of one embodiment of our invention, reference being had to the accompanying drawings in which:

Fig. 1 is a side elevational view of the rear portion of the motor vehicle.

Fig. 2 is a fragmentary, transverse sectional view taken on the line 2—2 of Fig. 1 and showing our improved fender welt.

Fig. 3 is a sectional view taken on the line 3—3 of Fig. 2.

Fig. 4 is a perspective view of our improved welt.

Fig. 5 is an enlarged elevational view of the head portion of the fender welt.

In the drawings, we have shown a motor vehicle, generally designated by the numeral 10, comprising a body portion 11 which has a conventional fender 12 secured thereto. Referring now more particularly to Fig. 2, the body portion 11 is provided with a substantially horizontal smooth

2 wall 13 having a depending substantially vertical wall 14 integral therewith. The fender 12 is provided with a substantially smooth horizontal wall 15 which is aligned with the wall 13 of the body portion 11 and which has a vertical wall 16 extending downwardly therefrom. The walls 13 and 14 are juxtaposed the walls 15 and 16 as in conventional vehicle body construction and there is provided between the body wall portions 13 and 14 and the fender wall portions 15 and 16 a fender welt, generally designated by the numeral 17. The fender welt 17 is provided with a web portion 18 disposed between the walls 14 and 16 of the body portion and fender, respectively, and a head portion 19 integrally connected to the web portion at the top edge thereof. The web portion 18 is in the form of a strip which extends the entire distance of the juncture of the fender 12 with the body portion 11. The head portion 19 extends longitudinaly of the welt, presents a visible circular or rounded contour and is provided with depending lateral side portions 20 and 21 which engage the walls 13 and 15, respectively, adjacent the juncture of the fender and the body. As more clearly seen in Fig. 5, the head portion 19 is similar in section to the section of the head of a mushroom wherein the under surfaces of the lateral side portions are of concaved curvature. The configuration of the head portion 19 has been designed so that the lateral side portions 20 and 21, when forced downwardly, as clearly shown in Fig. 2, will deflect slightly and engage the walls 15 and 13, respectively, in a sealing manner to prevent the influx of water, dirt and other foreign matter.

The wall portion 14 of the vehicle body 11 is bowed or offset slightly inwardly at 22 to present a shoulder 23. The web portion 18 is provided with a bead 24 which, as shown in Fig. 4, extends longitudinally of the welt and is spaced from the head portion 19 a slightly shorter distance than the distance of the shoulder 23 from the wall 13. By this construction, the bead 24 is engaged by the shoulder 23 and the wall 16 in a clamping manner when the fender and body portion are assembled and since the distance from the bead to the base of the head portion is shorter than the distance from the shoulder to the wall 13, the lateral edge portions 20 and 21 of the head portion 19 are pulled downwardly on to the smooth surface formed by the cooperating walls 15 and 13, respectively.

In order that the fender may be assembled with the body and that the bead 24 may engage the shoulder 23 and the wall 16, the assembly is provided with a series of nut and bolt units 25, one of which is shown in Fig. 2, the bolt thereof extending through the wall 14 of the body portion 11, a slot 26 in the web portion 18 of the welt and the wall 16 of the fender 12. The slots 26, one of which is more clearly shown in Fig. 3, are provided in the web portion 18 of the welt 17 not only to allow passage of the nut and bolt assemblies 25 but also to prevent wrinkling of the lower portion of the fender welt when it is applied along a curved path, and to facilitate the pliability of the welt when it is put in place. This may be readily seen since the welt is curved during application to follow the juncture of the fender and the body. Larger slots than those needed to accommodate the passage of the bolts may be used and in this way material may be saved without affecting the efficiency of the welt.

By applying the nut and bolt assemblies 25 so that the fender is mounted on the body portion, the wall 16 is spaced from the wall 14 at the upper portion thereof a distance equal to the width of the web portion between the bead 24 and the head portion 19. The walls 14 and 16 engage the web portion at that location as well as at a location at the lower lateral edge of the web portion. This latter location, designated by the numeral 27, has a width substantially equal to the width of the web portion 18 between the bead 24 and the head portion 19. The width of the web portion 18 between the location 27 and the bead 24 may be reduced, as shown in Fig. 2 and Fig. 4, to conserve on the amount of material used. In the past the head portion used on conventional fender welts has been metal and a satisfactory seal between the head portion and the cooperating smooth surfaces of the body and fender has not been obtained. The head portion 19 as well as the entire welt 17, as disclosed in our improved invention, comprises non-metallic, non-absorbent yieldable rubber-like material. It may be readily seen that the depending lateral side portions 20 and 21 of our improved welt may easily be pulled down in a sealing manner on to the walls 15 and 13, respectively, by a combination of the bead 24 engaging the shoulder 23 and the wall 16 and the clamping action of the nut and bolt assemblies 25. The inclined sides of the bead 24 and shoulder 23 aid in pulling the head 19 downwardly. The lower edge portion of the web 18 is thicker than the remainder of the web and it therefore serves to space apart the portions of the walls 14 and 16 of the fender and body between which it is engaged sufficiently to securely clamp the upper edge portion of the web 18 between the upper edge portions of these walls when the nut and bolt assemblies are tightened. In this manner, the entrance of water to the location between the walls 14 and 16 is clearly reduced if not entirely eliminated. Further, if any water should possibly get by the seal formed by the side portions 20 and 21, the seal formed by the bead 24, the wall 16 and the shoulder 23 would provide an excellent barrier. If by some possibility the water got through both seals, it would not be retained within the space between the walls 14 and 16 because of the slots 26 which would allow drainage and ventilation and also because the entire welt 17 is non-absorbent and would not retain the water. Therefore, it should be noted that because of this dual feature of preventing the entrance of water as well as the retention thereof, rusting of the body portion 11 and the fender 12 adjacent the juncture thereof is eliminated.

Although various methods may be employed in the assembly of our improved welt with the body and fender, it has been found convenient to first loosely bolt the fender on to the body and then insert the welt between the two. After the welt has been put in place with the slots 26 receiving the bolts, the nuts may be tightened until the structure is substantially rigid.

It should be pointed out that by employing an entire plastic or rubber-like fender welt to the assembly of the body and fender, the color scheme of the automobile may be enhanced. This is true since the plastic or rubber-like material may be precolored at the manufacturers thereof before it is assembled with the vehicle to the color of the vehicle body portion and the fender thereby giving the vehicle a smooth appearance.

Although numerous types of yieldable rubber-like materials may be used for our improved fender welt, the following materials have been found satisfactory; natural rubber; synthetic rubber such as neoprene, (polychloroprene) and rubber-like vinyl or other resin compounds.

The elimination of rust is one of the principal objects of our invention and so it should be noted that our improved welt may be made with a metallic head portion without departing from the spirit of the invention. A head portion composed of any one of various metallic compositions may be secured to the plastic web portion without depriving the welt of its non-rusting qualities.

Although but one specific embodiment of the invention is herein shown and described, it will be understood that various changes in the sequence of operations, steps and materials employed may be made without departing from the spirit of the invention.

We claim:

1. In a vehicle having a body portion and a fender, each having portions cooperating to form a substantially smooth surface and a chamber spaced from said surface, a welt of yieldable non-absorbent material comprising a web portion disposed between said fender and body portion and having a bead thereon disposed within said chamber, a head portion integrally connected to said web portion having portions engaging said surface, said chamber having a wall portion engaging said bead and urging said head portion against said surface and means for clampingly holding said web portion between said body portion and said fender, said means cooperating with said bead to effect a seal of said head portion and said surface.

2. In a vehicle having a body portion and a fender, each having portions cooperating to form a substantially smooth surface and a chamber spaced from said surface, a welt of yieldable non-absorbent plastic material comprising a web portion disposed between said body portion and fender and having a bead extending longitudinally thereof within said chamber, a head portion integrally secured to said web portion and engaging said body portion and fender on said surface, said bead engaging a well of said chamber and urging said head portion into sealing engagement with said surface, and means maintaining said body portion and fender in an assembled relationship.

3. In a vehicle having a body portion and a fender, each having portions cooperating to form a substantially smooth surface and a chamber spaced from said surface, a welt comprising a web portion of yieldable non-absorbent material disposed between said body portion and fender and having a bead extending longitudinally thereof within said chamber, a head portion secured to said web portion and engaging said body portion and fender on said surface, said bead engaging a wall of said chamber and urging said head portion against said surface, said bead being spaced from said head portion a slightly shorter distance than the distance said chamber is spaced from said surface and means securing said body portion and fender in an assembled relationship.

STEPHEN D. BRADLEY.
RUFUS C. SANDERS.

REFERENCES CITED

The following references are of record in the file of this patent:

UNITED STATES PATENTS

| Number | Name | Date |
|---|---|---|
| Re. 13,945 | McCormick | July 13, 1915 |
| 1,964,675 | Schemmel | June 26, 1934 |
| 2,234,121 | Hedeen | Mar. 4, 1941 |

Certificate of Correction

August 28, 1951

Patent No. 2,566,282

STEPHEN D. BRADLEY ET AL.

It is hereby certified that error appears in the printed specification of the above numbered patent requiring correction as follows:

Column 4, line 71, for "well" read *wall*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*